US011361797B2

(12) United States Patent
Seki (10) Patent No.: US 11,361,797 B2
(45) Date of Patent: Jun. 14, 2022

(54) MOVING IMAGE REPRODUCTION APPARATUS, MOVING IMAGE REPRODUCTION METHOD, MOVING IMAGE REPRODUCTION SYSTEM, AND STORAGE MEDIUM

(71) Applicant: CANON KABUSHIKI KAISHA, Tokyo (JP)

(72) Inventor: Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/784,126

(22) Filed: Feb. 6, 2020

(65) Prior Publication Data
US 2020/0258550 A1 Aug. 13, 2020

(30) Foreign Application Priority Data
Feb. 8, 2019 (JP) .............................. JP2019-021952

(51) Int. Cl.
| | | |
|---|---|---|
| *G11B 31/00* | (2006.01) | |
| *G06V 20/40* | (2022.01) | |
| *G06V 40/10* | (2022.01) | |
| *G11B 27/30* | (2006.01) | |
| *H04N 7/18* | (2006.01) | |
| *G06V 20/52* | (2022.01) | |
| *G11B 27/28* | (2006.01) | |

(52) U.S. Cl.
CPC ............ *G11B 31/006* (2013.01); *G06V 20/46* (2022.01); *G06V 40/10* (2022.01); *G11B 27/30* (2013.01); *H04N 7/183* (2013.01); *G06V 20/44* (2022.01)

(58) Field of Classification Search
CPC ..... G11B 31/006; G11B 27/30; G11B 27/322; G06K 9/00744; G06K 9/00362; H04N 5/23216; H04N 7/183
USPC ............... 382/103; 348/231.2; 386/223–224, 386/228–230, 239–248
See application file for complete search history.

(56) References Cited

U.S. PATENT DOCUMENTS

| | | | | |
|---|---|---|---|---|
| 2010/0222140 A1* | 9/2010 | Dewaal | ................... | G07F 17/32 463/29 |
| 2011/0249861 A1* | 10/2011 | Tokutake | ............... | G11B 27/34 382/103 |

(Continued)

FOREIGN PATENT DOCUMENTS

JP 2007-251646 A 9/2007

*Primary Examiner* — Hung Q Dang
(74) *Attorney, Agent, or Firm* — Canon U.S.A., Inc. IP Division (57) ABSTRACT

In a case where an event occurs, a moving image corresponding to a time period during which a matter relating to the event is detectable is reproduced. A moving image reproduction apparatus includes a human figure detection unit that detects a first human figure and a second human figure detected during an event time period which is a partial time period which an event continues, a specification unit that specifies a first human figure appearance time period during which the first human figure appears and a second human figure appearance time period during which the second human figure appears, and a display control unit that controls reproduction of a time period of a moving image, the time period including a time from the first human figure appearance time period to the second human figure appearance time period.

14 Claims, 12 Drawing Sheets

(56) References Cited

U.S. PATENT DOCUMENTS

| | | | |
|---|---|---|---|
| 2013/0051776 A1* | 2/2013 | Bowes | H04N 5/783 386/353 |
| 2014/0372424 A1* | 12/2014 | Markov | G06F 16/745 707/725 |
| 2015/0186375 A1* | 7/2015 | Watanabe | G06F 16/58 348/231.2 |
| 2015/0212719 A1* | 7/2015 | Gottschlag | G08B 13/19682 715/720 |

* cited by examiner

| TYPE | DETAILS | VOLUME |
|---|---|---|
| HUMAN VOICE 1 | MAN/WOMAN/CHILD | HIGH |
| HUMAN VOICE 2 | SCREAM/CALL/ ANGRY SHOUT/CHEERS | |
| ANIMAL | CALL/ROARING | MIDDLE |
| VEHICLE | PASSENGER VEHICLE/ TRUCK/MOTORCYCLE | |
| ABNORMAL SOUND | EXPLOSION/BULLET/ GLASS BREAKAGE/COLLISION | LOW |
| NOISE | BUZZ/WIND NOISE/TRAFFIC | |

|  | STARTING TIME | ENDING TIME |
|---|---|---|
| ENTIRE MOVING IMAGE | 10:00:00 | 11:00:00 |
| SEARCH RANGE | 10:10:00 | 10:20:00 |
| EVENT TIME PERIOD | 10:15:30 | 10:16:00 |

FIG.9

| OBJECT | OBJECT APPEARANCE TIME PERIOD | |
|---|---|---|
| | STARTING POINT ($T^*_s$) | ENDING POINT ($T^*_e$) |
| A | 10:15:20 | 10:15:55 |
| B | 10:15:25 | 10:16:15 |
| C | 10:15:35 | 10:15:45 |
| D | 10:15:15 | 10:15:35 |
| E | 10:15:45 | 10:16:20 |
| F | 10:15:45 | 10:16:25 |

MOVING IMAGE REPRODUCTION APPARATUS, MOVING IMAGE REPRODUCTION METHOD, MOVING IMAGE REPRODUCTION SYSTEM, AND STORAGE MEDIUM

BACKGROUND

Field of the Disclosure

The present disclosure relates to a moving image reproduction apparatus, a moving image reproduction method, a moving image reproduction system, and a storage medium.

Description of the Related Art

Conventionally, moving image reproduction devices that efficiently perform reproduction have been commercialized. In such devices, for example, each chapter of a recorded video image is displayed, tag information indicating a specific scene is provided, and a user specifies a keyword to cause a list of candidates to be displayed. Further, Japanese Patent Application Laid-Open No. 2007-251646 discusses a technique that displays a monitoring video image before and after occurrence of an even in a case where the event occurs.

SUMMARY

According to an aspect of the present disclosure, a moving image reproduction apparatus includes a human figure detection unit that detects a first human figure and a second human figure detected in a moving image during an event time period which is a partial time period of the moving image and is a time period during which an event continues, a specification unit that specifies a first human figure appearance time period during which the first human figure detected during the event time period appears in the moving image and a second human figure appearance time period during which the second human figure appears in the moving image, and a display control unit that controls reproduction of a time period of the moving image, the time period including a time from the first human figure appearance time period to the second human figure appearance time period.

Further features of the present disclosure will become apparent from the following description of exemplary embodiments with reference to the attached drawings.

DESCRIPTION OF THE EMBODIMENT

An exemplary embodiment of the present disclosure will be described below with reference to the drawings.

Figure 1:
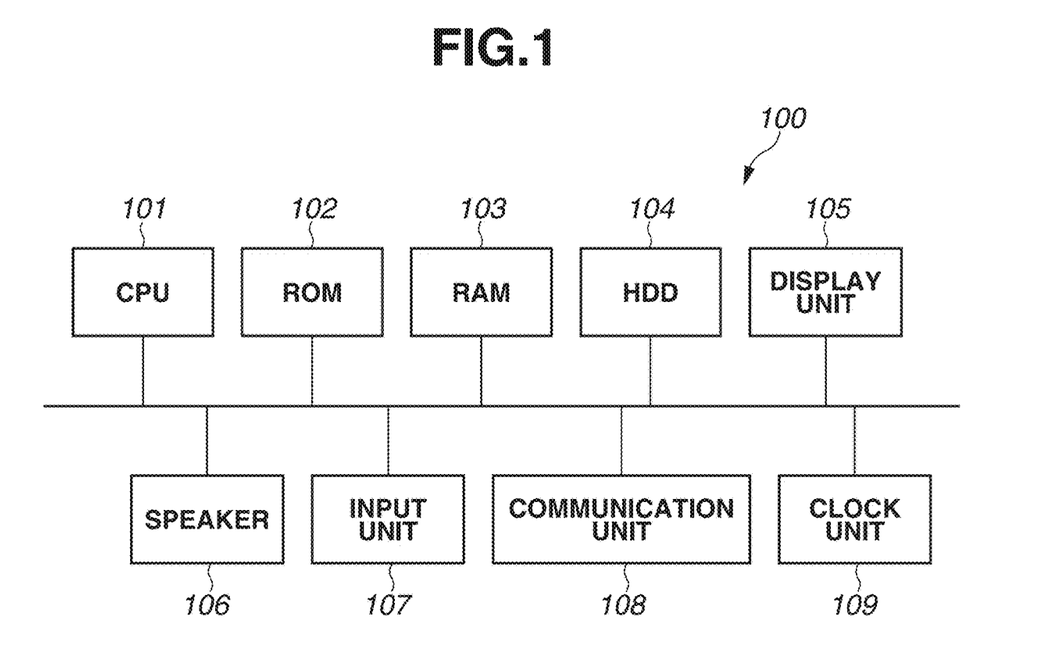
FIG. 1 is a hardware configuration diagram of a moving image reproduction apparatus according to one or more aspects of the present disclosure.

FIG. 1 is a hardware configuration diagram of a moving image reproduction apparatus 100 according to the exemplary embodiment. The moving image reproduction apparatus 100 includes a central processing unit (CPU) 101, a read only memory (ROM) 102, a random access memory (RAM) 103, a hard disk drive (HDD) 104, a display unit 105, a speaker 106, an input unit 107, a communication unit 108, and a clock unit 109. The CPU 101 reads out a control program stored in the ROM 102 to execute various kinds of processing. The RAM 103 is used as a temporary storage area such as a main memory and a work area of the CPU 101. The HDD 104 stores various kinds of data and various programs. The display unit 105 displays various kinds of information. The display unit 105 reproduces and displays a moving image, for example. The display unit 105 further displays a menu screen, etc. The speaker 106 outputs a sound. The input unit 107, which includes a keyboard, a mouse, and a joy stick, accepts various operations from a user. The display unit 105 and the input unit 107 may be integrally provided as a touch panel. The communication unit 108 executes communication processing with an external apparatus via a network. The clock unit 109 counts a time.

Functions and processing, described below, of the moving image reproduction apparatus 100 are achieved by the CPU 101 reading out a program stored in the ROM 102 or the HDD 104 and executing the program. Further, in another example, the CPU 101 may read out a program stored in a recording medium such as a Secure Digital (SD) card instead of the ROM 102.

In a still another example, the functions and the processing of the moving image reproduction apparatus 100 may be at least partially achieved by causing, for example, a plurality of CPUs, RAMs, ROMs, and storages to cooperate with one another. In still another example, the functions and the processing of the moving image reproduction apparatus 100 may be at least partially achieved by using a hardware circuit.

Figure 2:
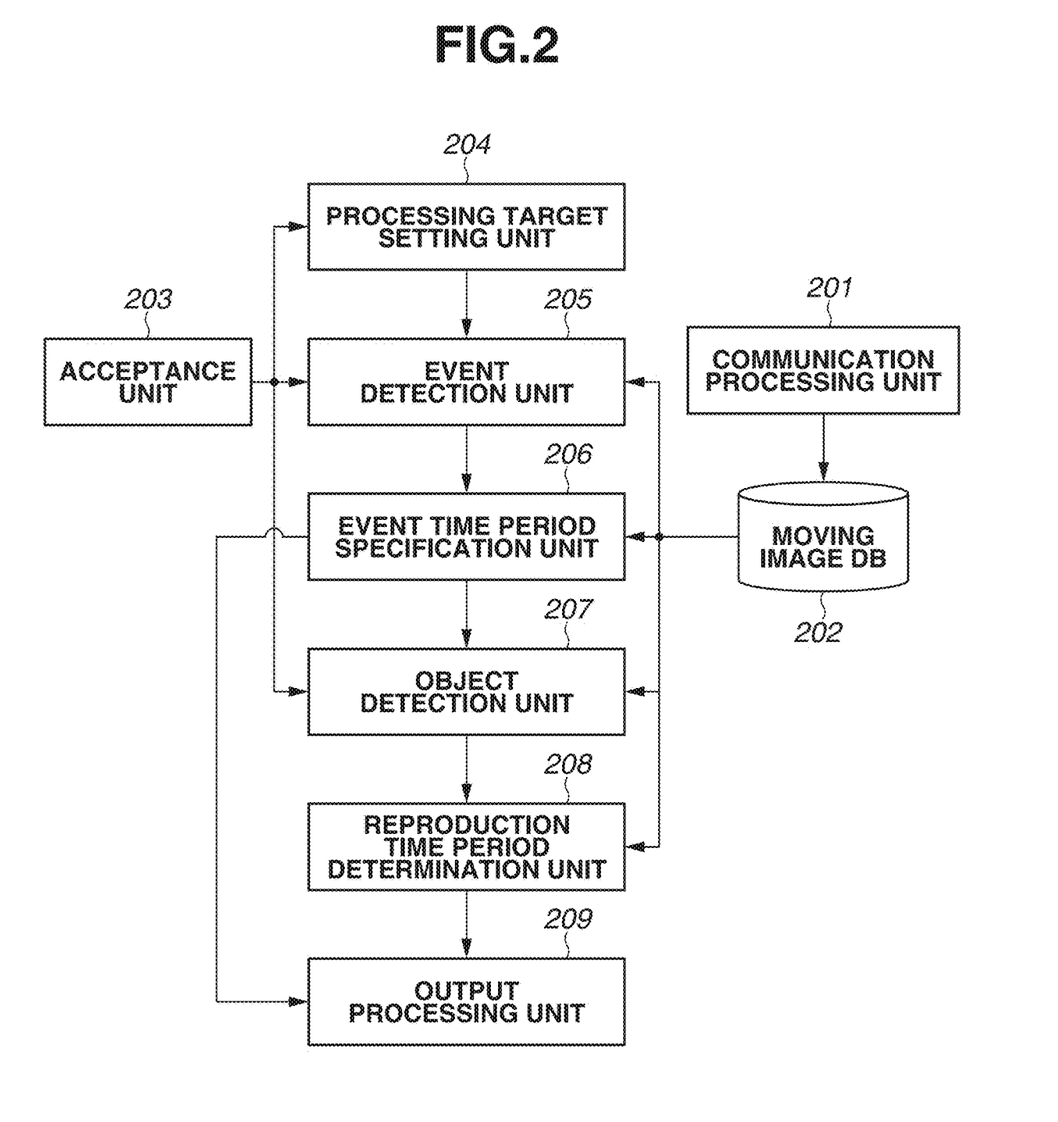
FIG. 2 is a functional configuration diagram of the moving image reproduction apparatus.

FIG. 2 is a functional configuration diagram of the moving image reproduction apparatus 100. The moving image reproduction apparatus 100 includes a communication processing unit 201, a moving image database (DB) 202, an acceptance unit 203, a processing target setting unit 204, an event detection unit 205, an event time period specification unit 206, an object detection unit 207, a reproduction time period determination unit 208, and an output processing unit 209.

The communication processing unit 201 controls communication with an external device. The moving image DB 202 stores one or more two moving images. The moving image DB 202 according to the present exemplary embodiment stores moving images captured by a monitoring camera via the communication processing unit 201. The moving images include sounds. The acceptance unit 203 accepts various kinds of information in response to a user's operation. The acceptance unit 203 accepts, for example, an instruction for selecting a video image. The processing target setting unit 204 sets a moving image to be processed, an event to be searched, and an event search range in response to the user's operation.

The event detection unit 205 detects an event specified by the user's operation, etc. The event detection unit 205 according to the present exemplary embodiment detects an abnormal sound as an event. Specifically, if a sound feature amount of the abnormal sound is specified by the user's operation, the event detection unit 205 specifies a sound, which is detected based on the specified sound feature amount, as an abnormal sound (event). The event is not limited to a sound such an abnormal sound. In still another example, the event detection unit 205 detects events in a moving image based on an image feature amount. The events include an event that someone or something is left behind and something is carried away, and an event that not less than a predetermined number of human figures are present. A range where the event detection unit 205 searches for an event is a recording time period of a moving image to be processed.

The event time period specification unit 206 specifies a time period during which an event continues. Specifically, the event time period specification unit 206 refers to a counted result of the clock unit 109, and specifies a starting time and an ending time of the event. The event time period specification unit 206 then specifies a time period from the event starting time to the event ending time as the event time period. The object detection unit 207 detects an object such as a human figure in a moving image to be processed. In the present exemplary embodiment, the object detection unit 207 detects a human figure, but the object is not limited to a human figure. Further, the object detection unit 207 detects an object using a difference in a pixel between frames and object extraction, but specific processing for detecting an object is not limited to the present exemplary embodiment. Information about an event detected result and an event time period is associated as meta data of a moving image with a moving image, and is stored in the moving image DB 202.

The reproduction time period determination unit 208 determines a reproduction time period based on the object detected result from the object detection unit 207. Here, the reproduction time period means a time period of a moving image to be processed, i.e., a time period during which a moving image relating to an event is reproduced in a case where the event is specified by the user's operation.

The output processing unit 209 controls output to the display unit 105 and the speaker 106. The output processing unit 209 controls, for example, a moving image stored in the moving image DB 202 such that the moving image is reproduced and displayed on the display unit 105. The output processing unit 209 further controls reproduction and output of a sound associated with the moving image from the speaker 106. The output processing unit 209 further controls display of a menu screen on the display unit 105.

Figure 3:
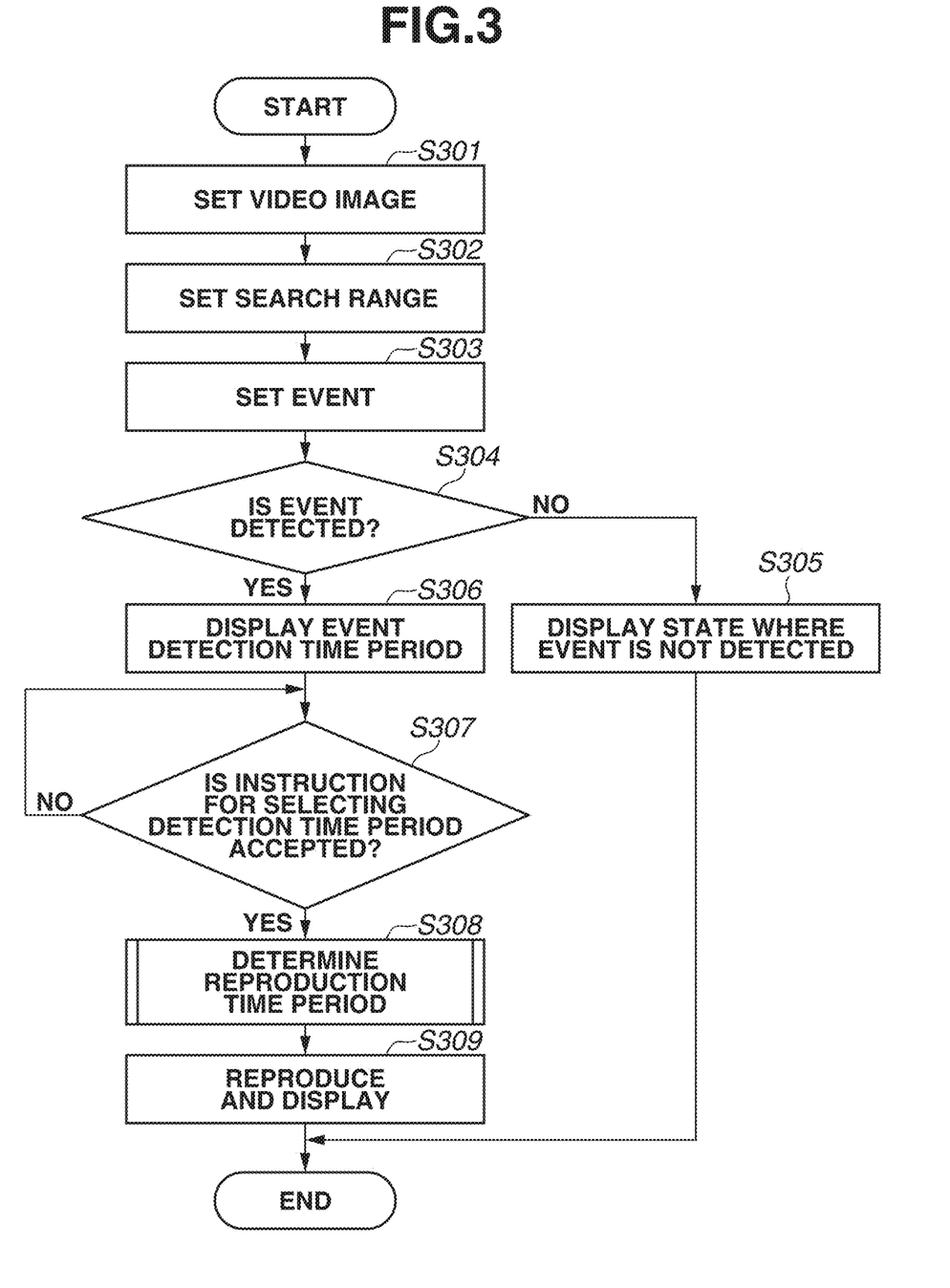
FIG. 3 is a flowchart illustrating reproduction and display processing.

FIG. 3 is a flowchart illustrating reproduction and display processing in the moving image reproduction apparatus 100. The processing in the flowchart is executed by the CPU 101 based on a control program, which is stored in the ROM 102 and is invoked by the RAM 103. In step S301, the processing target setting unit 204 first sets a moving image to be processed in response to the user's operation. Specifically, the output processing unit 209 controls a list screen of moving images stored in the moving image DB 202 such that the list screen is displayed on the display unit 105. When the user selects one moving image, the acceptance unit 203 accepts an instruction for selecting one moving image. The processing target setting unit 204 sets the moving image relating to the selecting instruction as the moving image to be processed.

In step S302, the processing target setting unit 204 then sets an event search range. Here, the search range means a time period of a part or the whole of a moving image to be processed. The processing target setting unit 204 sets the search range in response to the user's operation. As another example, the entire time period of the moving image to be processed may be preset as a processing target. In step S303, the processing target setting unit 204 then sets an event to be searched. Specifically, the processing target setting unit 204 sets an event selected in response to the user's operation as the event to be searched.

Figure 4:
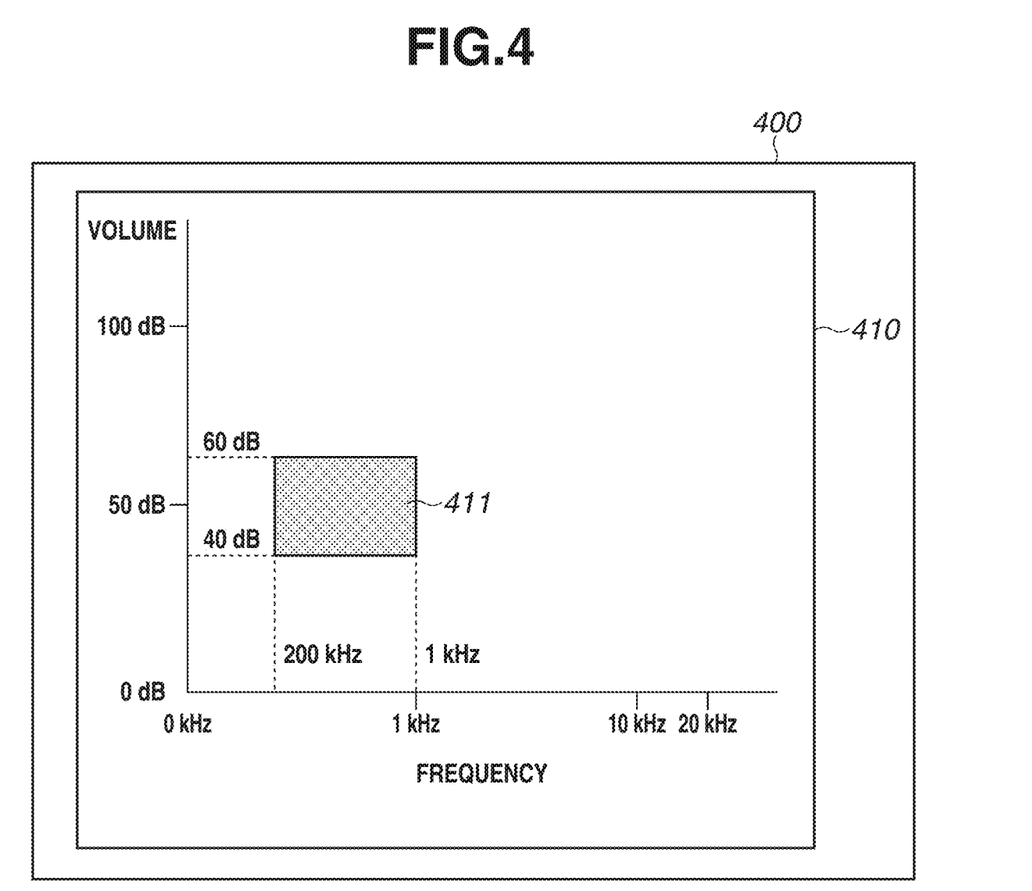
FIG. 4 is a diagram illustrating a display example of a sound setting screen.

Specifically, in step S303, the processing target setting unit 204 displays a sound setting screen 400 illustrated in FIG. 4. A graph 410, in which a horizontal axis represents a frequency and a vertical axis represents a volume, is displayed on the sound setting screen 400. On the graph 410, the user can specify a frequency and a volume (sound feature) corresponding to an abnormal sound desired to be searched. Hereinafter, the frequency and the volume are referred to as sound features. Like an area 411 illustrated in FIG. 4, a sound feature having a certain width can be specified. The area 411 corresponds to a frequency range from 200 Hz to 1 kHz and a volume range from 40 dB to 60 dB.

Figure 5:
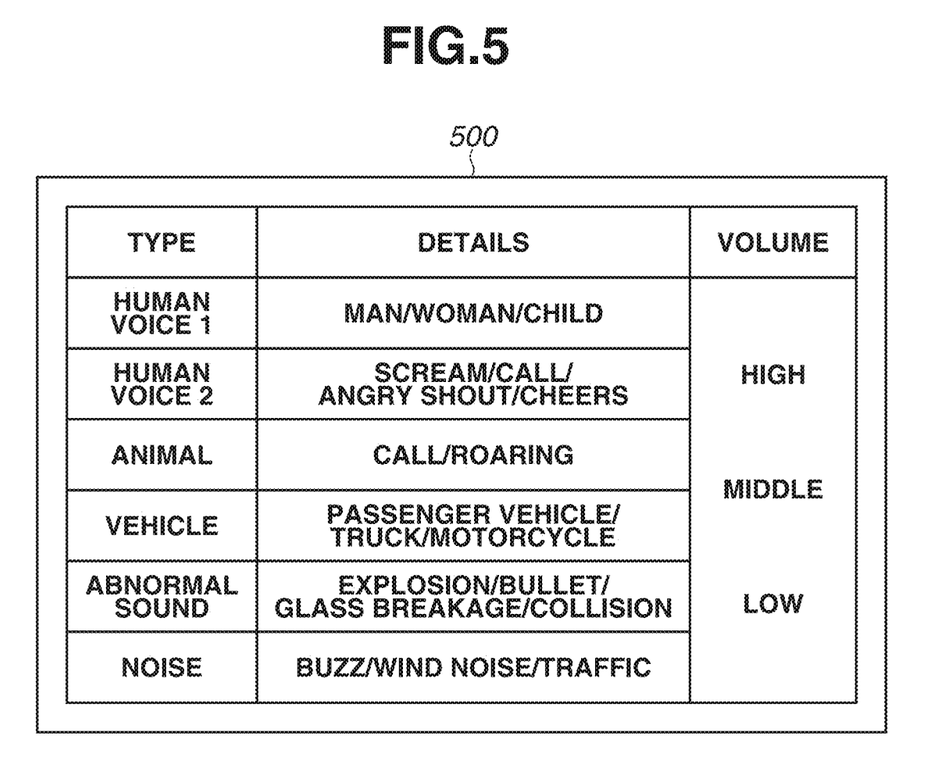
FIG. 5 is a diagram illustrating another example of a sound setting screen.

FIG. 5 is a diagram illustrating another example of the sound setting screen 500. The sound setting screen 500 includes the type of sound, information associated with details of the type, and the volume. The user can specify a desired type of sound and a desired volume on the sound setting screen 500. In this case, the processing target setting unit 204 can specify the frequency range and the volume range as sound features in response to the user's specification. For example, the user selects "human voice 1", "female", and "high volume". In this case, the processing target setting unit 204 specifies the sound features of a frequency ranging from 400 Hz to 1 kHz, and a volume ranging from 60 dB to 80 dB.

In another example, the processing target setting unit 204 adds more detailed conditions, such as a sound length and a repetition frequency, as sound features. In this case, information for specifying conditions to be added is displayed on the display unit 105.

In step S304, the processing target setting unit 204 then detects the event, which has been set as the search target in step S303, within the search range set in step S302. At this time, the processing target setting unit 204 detects an abnormal sound as an event within the search range set in step S302, based on the sound feature specified in step S303. Template matching for the sound feature is used in sound detection processing. The specific sound detection processing is not limited to the present exemplary embodiment. If the event is detected (YES in step S304), the processing target setting unit 204 associates the sound detected result with a moving image to be processed to store the moving image associated with the sound detected result in the moving image DB 202. The processing then proceeds to step S306. If the event is not detected (NO in step S304), the processing proceeds to step S305. In step S305, the output processing unit 209 controls the display unit 105 to display a state where the event specified by the user is not detected. Then, the reproduction and display processing ends.

Figure 6:
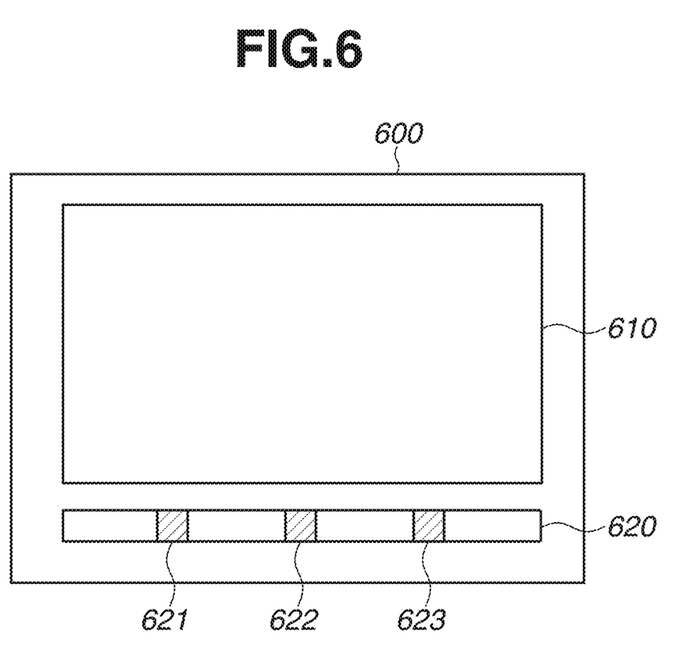
FIG. 6 is a diagram illustrating an example of a detection time period screen.

In step S306, the output processing unit 209 causes the display unit 105 to display a detection time period that is a time period during which the event has been detected in step S304. The detection time period means a time period from an event occurrence point to an event ending point. In a case where a plurality of events is detected in the search range, detection time periods of the respective events are displayed. FIG. 6 is a diagram illustrating an example of a detection time period screen 600. The detection time period screen 600 includes a moving image reproduction area 610 and a detection time period area 620. A moving image is reproduced and displayed on the moving image reproduction area 610. The detection time period area 620 is an area indicating the search range in which a horizontal axis represents a time. The detection time period area 620 indicates detection time periods 621, 622, and 623 during which events are detected, in a selectable state.

The description returns to FIG. 3. In step S307, it is determined whether the acceptance unit 203 accepts an instruction for selecting a detection time period after the processing in step S306. When any one of the detection time periods 621, 622, and 623 in the detection time period area 620 illustrated in FIG. 6 is selected, the acceptance unit 203 accepts an instruction for selecting the detection time period. The acceptance unit 203 stands by until the acceptance of the selecting instruction, and if accepts the selecting instruction (YES in step S307), the processing proceeds to step S308. In step S308, the object detection unit 207 or the like executes reproduction time period determination processing. The reproduction time period determination processing in step S308 will be described in detail below with reference to FIG. 7. In step S309, the output processing unit 209 reproduces the moving image and sound of the reproduction time period in synchronization with each other. This processing is an example of display control processing. The reproduction and display processing is completed.

Figure 7:
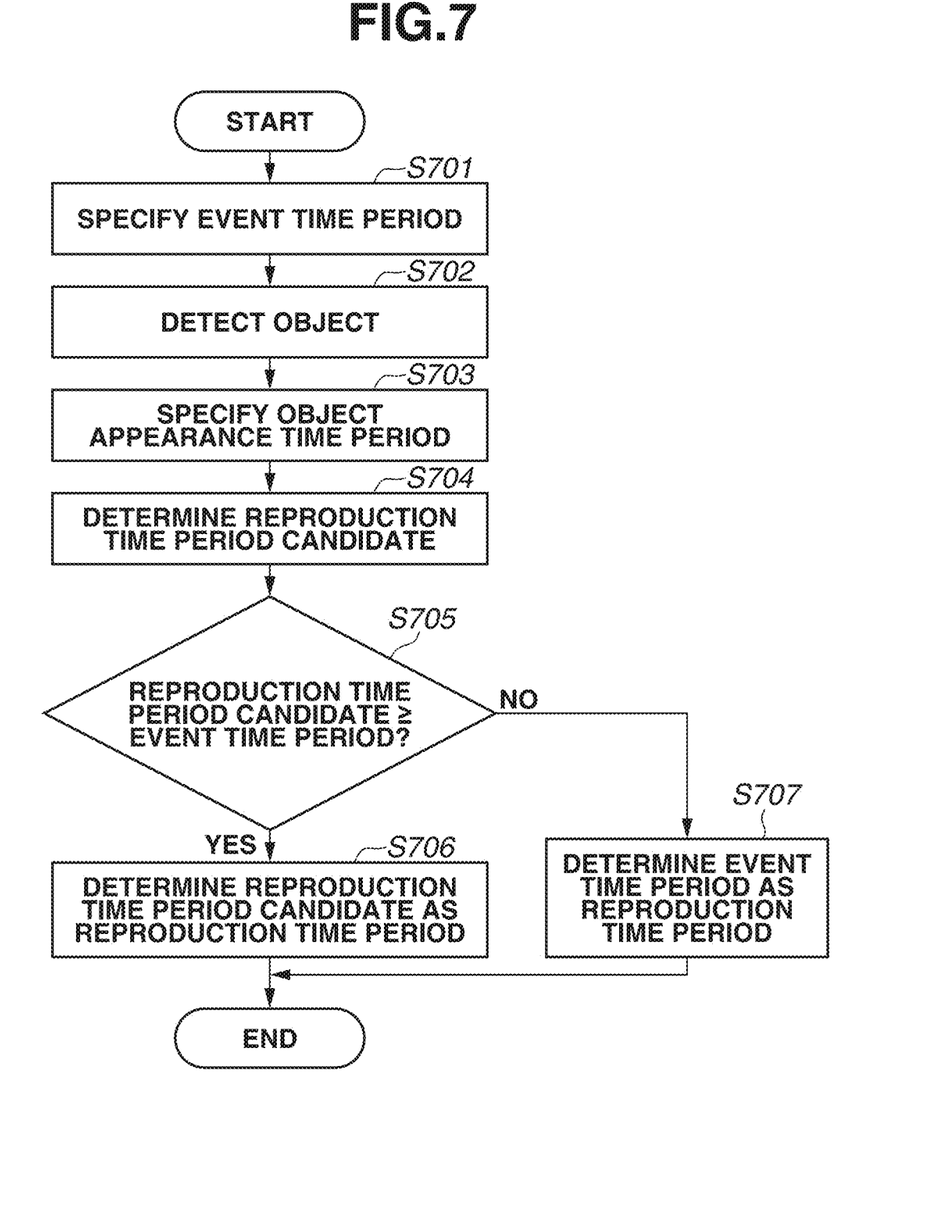
FIG. 7 is a flowchart illustrating reproduction time period determination processing.

FIG. 7 is a flowchart illustrating details of the reproduction time period determination processing in step S308. In step S701, the event time period specification unit 206 specifies an event relating to the selecting instruction accepted by the acceptance unit 203 in step S307 as an event to be processed. Hereinafter, the event to be processed is described as a target event. The event time period specification unit 206 specifies a time period from the starting to the ending of the target event as the event time period. Specifically, the processing target setting unit 204 specifies the starting time and ending time of the target event based on the measured result in the clock unit 109, and specifies the time period from the starting time to the ending time of the target event as the event time period.

In step S702, the object detection unit 207 detects an object within the search range of the moving image as the event time period. If a plurality of objects is present in the moving image, the object detection unit 207 detects the plurality of objects. The object detection unit 207 stores the detected objects in a storage unit such as the RAM 103 or the HDD 104.

In step S703, the reproduction time period determination unit 208 specifies an object appearance time period based on the object detected result. Here, the object appearance time period means a time period during which the object detected during the event time period continuously appears. If a plurality of objects is detected during the event time period, the reproduction time period determination unit 208 specifies respective object appearance time periods for the plurality of objects. The reproduction time period determination unit 208 then makes an object appearance time period table in which the object appearance time periods are associated with object identifiers, and stores the table in the storage unit. Specifically, the reproduction time period determination unit 208 fast reproduces the moving image corresponding to the event time period in reverse for the object to be processed detected during the event time period. The reproduction time period determination unit 208 then specifies the time at which the object to be processed cannot be detected, as the starting point in the object appearance time period. Similarly, the reproduction time period determination unit 208 fast reproduces the moving image corresponding to the event time period in forward, and specifies the time at which the object to be processed cannot be detected, as the ending point in the object appearance time period.

In the present exemplary embodiment, the moving image reproduction apparatus 100 detects an object and specifies an object appearance time period. However, in a certain case, an external device detects an object in a moving image, and tag information representing an object detection time period is given to the moving image. In such a case, the moving image reproduction apparatus 100 may specify an object appearance time period based on the tag information without detecting an object.

Figure 8:
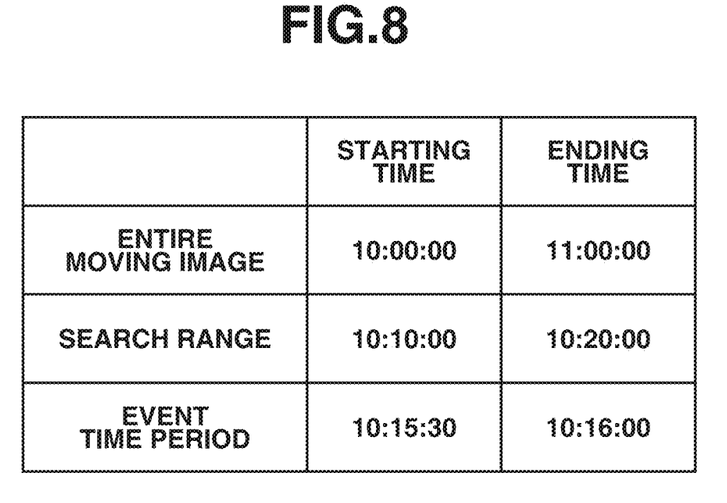
FIG. 8 is a diagram illustrating an example of a time period of an entire moving image, an event search range, and an event time period.
Figure 9:
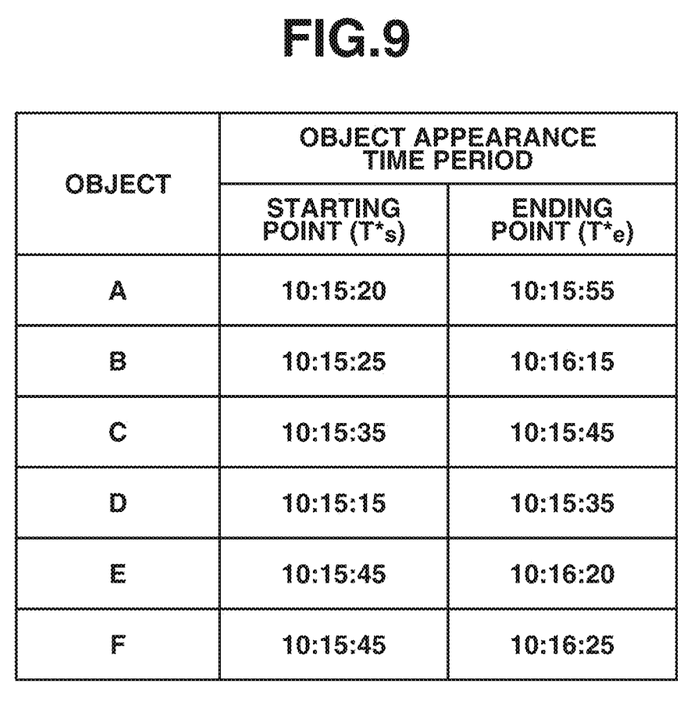
FIG. 9 is a diagram illustrating an example of an object appearance time period table.

FIG. 8 is a diagram illustrating an example of the time period of an entire moving image, the event search range, and the event time period. As illustrated in FIG. 8, the search range from a starting time 10:10:00 to an ending time 10:20:00 is set on the entire moving image from the starting time 10:00:00 to the ending time 11:00:00. Further, a time period from a starting time 10:15:30 to an ending time 10:16:00 is specified as the event time period. FIG. 9 is a diagram illustrating an example of an object appearance time period table 900 obtained in relation with the event time period illustrated in FIG. 8. In the object appearance time period table 900 to be stored, the objects detected during the event time period are associated with the object appearance time periods. Further, in the present exemplary embodiment, the starting points and the ending points in the object appearance time periods are stored as the object appearance time periods. For example, the starting point 10:15:20 and the ending point 10:15:55 are stored as the object appearance time period for an object A.

In step S704, the reproduction time period determination unit 208 determines a reproduction time period candidate based on the object appearance time period. Specifically, if only one object is detected during the event time period, the reproduction time period determination unit 208 determines the object appearance time period of the object as the reproduction time period candidate. On the other hand, if a plurality of objects is detected during the event time period, the reproduction time period determination unit 208 specifies the earliest starting time in the starting times in the object appearance time periods of the plurality of objects. The reproduction time period determination unit 208 further specifies the latest ending time in the ending times in the object detection time periods of the plurality of objects. The reproduction time period determination unit 208 then determines a time period from the earliest starting time in the starting times in the plurality of object appearance time periods to the latest ending time in the ending times in the plurality of object appearance time periods, as the reproduction time period candidate. This processing is an example of candidate determination processing.

Figure 10:
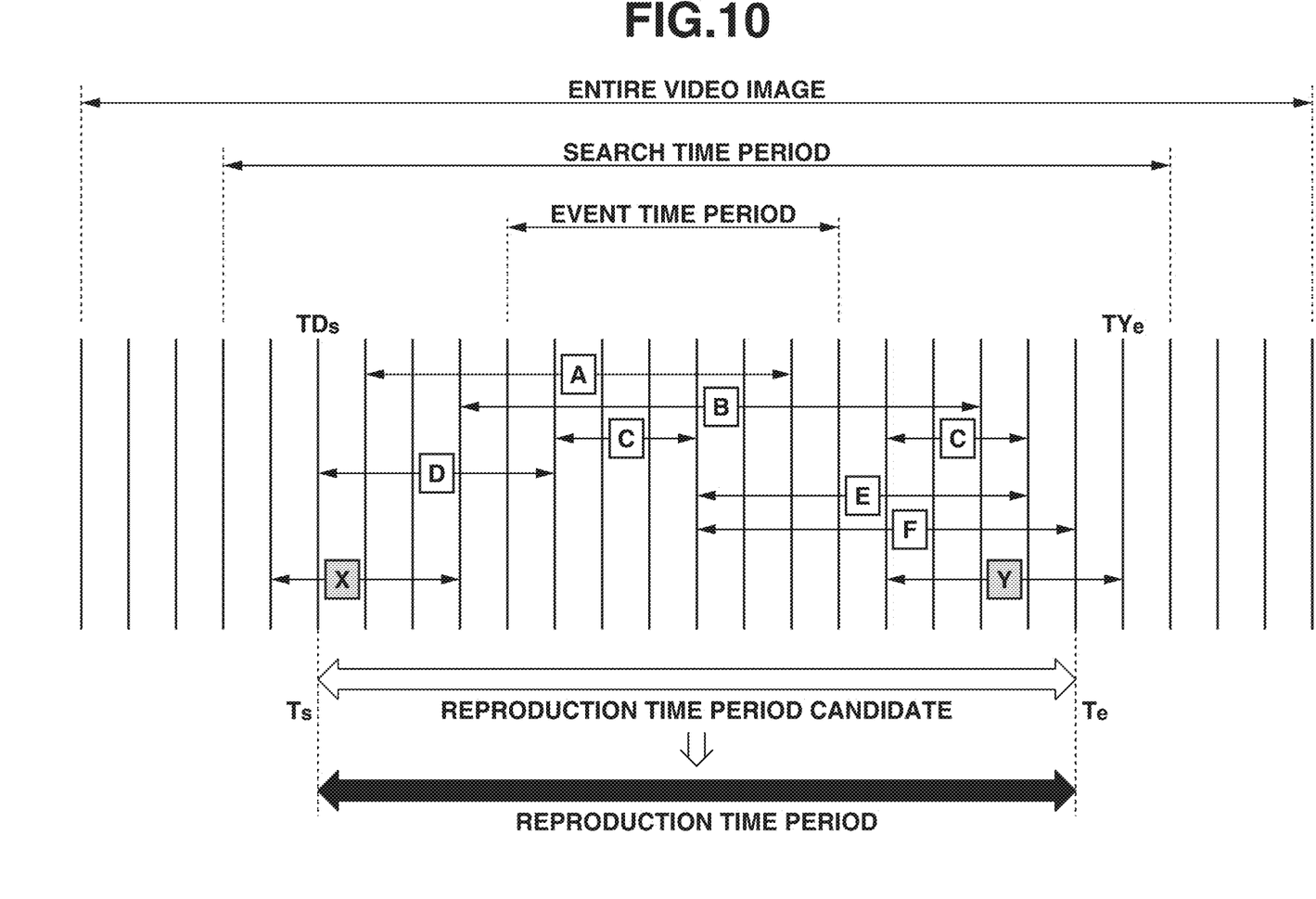
FIG. 10 is a diagram schematically illustrating the object appearance time period.

FIG. 10 is a diagram schematically illustrating the object appearance time periods of the plurality of objects illustrated in FIG. 9. All the object appearance time periods of objects A to F overlap the event time period. On the other hand, object detection time periods of objects X and Y do not overlap the event time period. Thus, the objects X and Y are not detected in step S702. The object C is detected within the event time period, once disappears, and is then detected again outside the event time period. In this case, only a time period during which the object C is detected during the event time period and continuously appears is the object appearance time period of the object C. A time period during which the object C is detected outside the event time period is not included in the object appearance time period.

In the example illustrated in FIG. 10, a starting point in the object appearance time period of the object D is the earliest starting point in the object appearance time periods of the objects A to F. An ending point in the object appearance time period of the object F is the latest ending point in the object appearance time periods of the objects A to F. Therefore, the reproduction time period determination unit 208 determines a starting point TDs in the object appearance time period of the object D as a starting point Ts, and an ending point TFe, not illustrated, in the object appearance time period of the object F as an ending point Te. Thus, the time period from the starting point TDs to the ending point TFe is the reproduction time period candidate.

The description returns to FIG. 7. After the processing in step S704, in step S705, the reproduction time period determination unit 208 compares the reproduction time period candidate determined in step S704 with the event time period. If a length of the reproduction time period candidate is more than or equal to a length of the event time period (YES in step S705), the processing proceeds to step S706. If the length of the reproduction time period candidate is less than the length of the event time period (NO in step S705), the processing proceeds to step S707. In step S706, the reproduction time period determination unit 208 determines the reproduction time period candidate as the reproduction time period. On the other hand, in step S707, the reproduction time period determination unit 208 determines the event time period as the reproduction time period. The reproduction time period determination processing in step S308 is completed.

Figure 11:
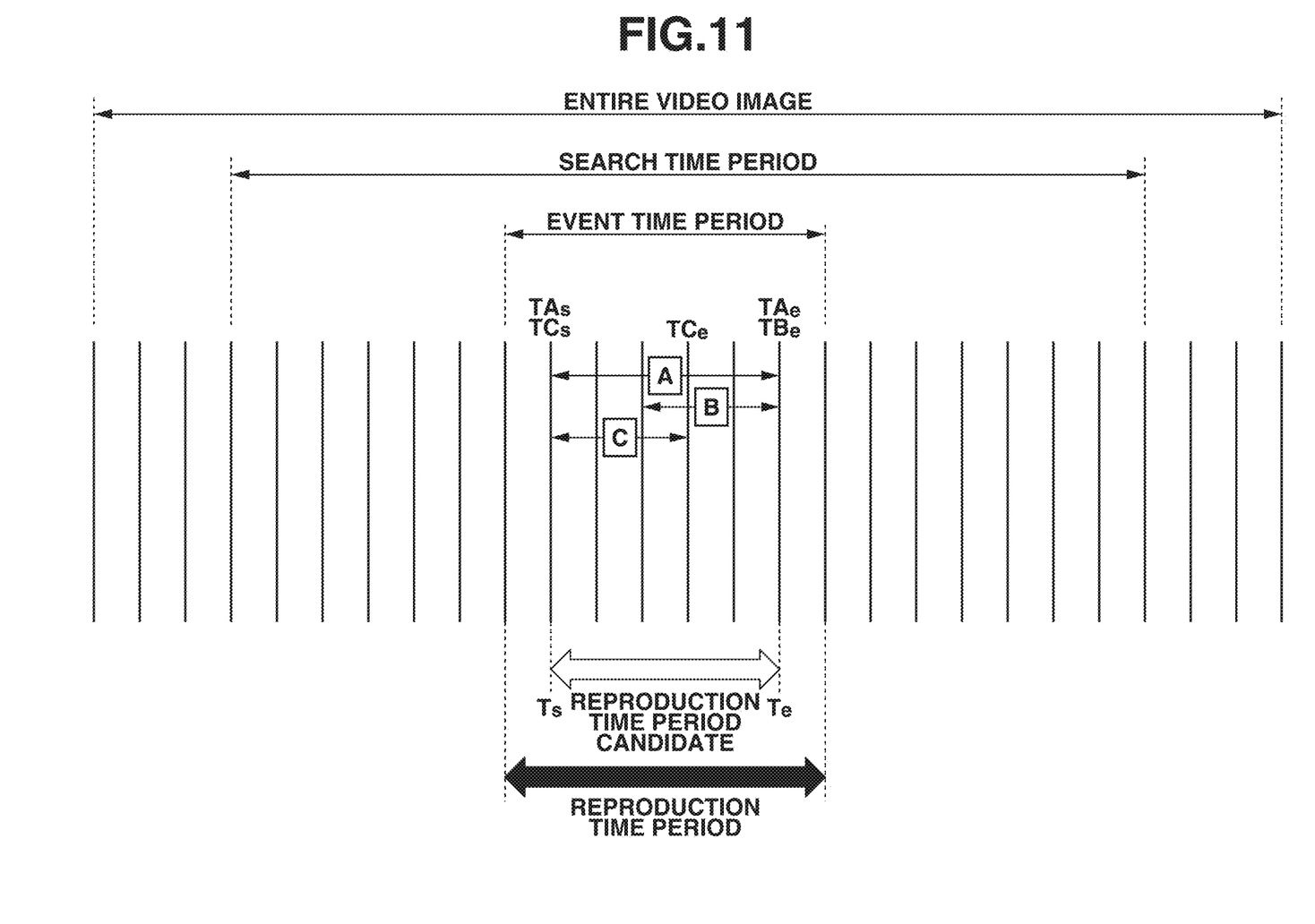
FIG. 11 is a diagram schematically illustrating the object appearance time period.

In the example of FIG. 10, the reproduction time period candidate is longer than the event time period. Therefore, the reproduction time period candidate is determined as the reproduction time period. On the other hand, as illustrated in FIG. 11, in a case where the reproduction time period candidate determined from the objects A to C detected during the event time period is shorter than the event time period, the event time period is determined as the reproduction time period.

In such a manner, the moving image reproduction apparatus 100 according to the present exemplary embodiment detects all objects that appear during the event time period relating to an event specified by a user. Then, the time period including the object appearance time periods of all the objects is determined as the reproduction time period. As a result, the user can follow a series of the movements of the objects relating to the event specified by the user by checking the moving image corresponding to the reproduction time period. Thus, a cause of the event specified by the user and a matter caused by this event can be determined. That is, the moving image reproduction apparatus 100 according to the present exemplary embodiment can reproduce a moving image corresponding to a time period during which a matter relating to an event is detectable if the event occurs.

A first modification of the present exemplary embodiment will be described below. In a case where the reproduction time period candidate is short, the moving image reproduction apparatus 100 secures a certain length of a reproduction time. The specific processing for this is not limited to the processing in steps S705 and S707 described in the present exemplary embodiment. That is, in a case where the reproduction time period candidate is shorter than a preset time period, the reproduction time period determination unit 208 determines a time period longer than the reproduction time period candidate as the reproduction time period. If the reproduction time period candidate is longer than the preset time period, the reproduction time period determination unit 208 determines the reproduction time period candidate as the reproduction time period. Here, the preset time period may be longer or shorter than the event time period. In any cases, even in a case where the reproduction time period candidate is extremely short, a certain length of time period can be secured as the reproduction time period. In a case where the time period longer than the reproduction time period candidate is determined as the reproduction time period, the reproduction time period preferably includes the event time period.

A second modification will be described below. In the present exemplary embodiment, the reproduction time period determination unit 208 has specified the time period during which an object detected during the event time period continuously appears, as the object appearance time period. Alternatively, in the present modification, the object detection unit 207 searches the entire event search range for the object detected during the event time period. Then, the reproduction time period determination unit 208 specifies a time period from the earliest starting point to the latest ending point in the entire time period during which the object has been detected in the search range, as the object appearance time period.

Figure 12:
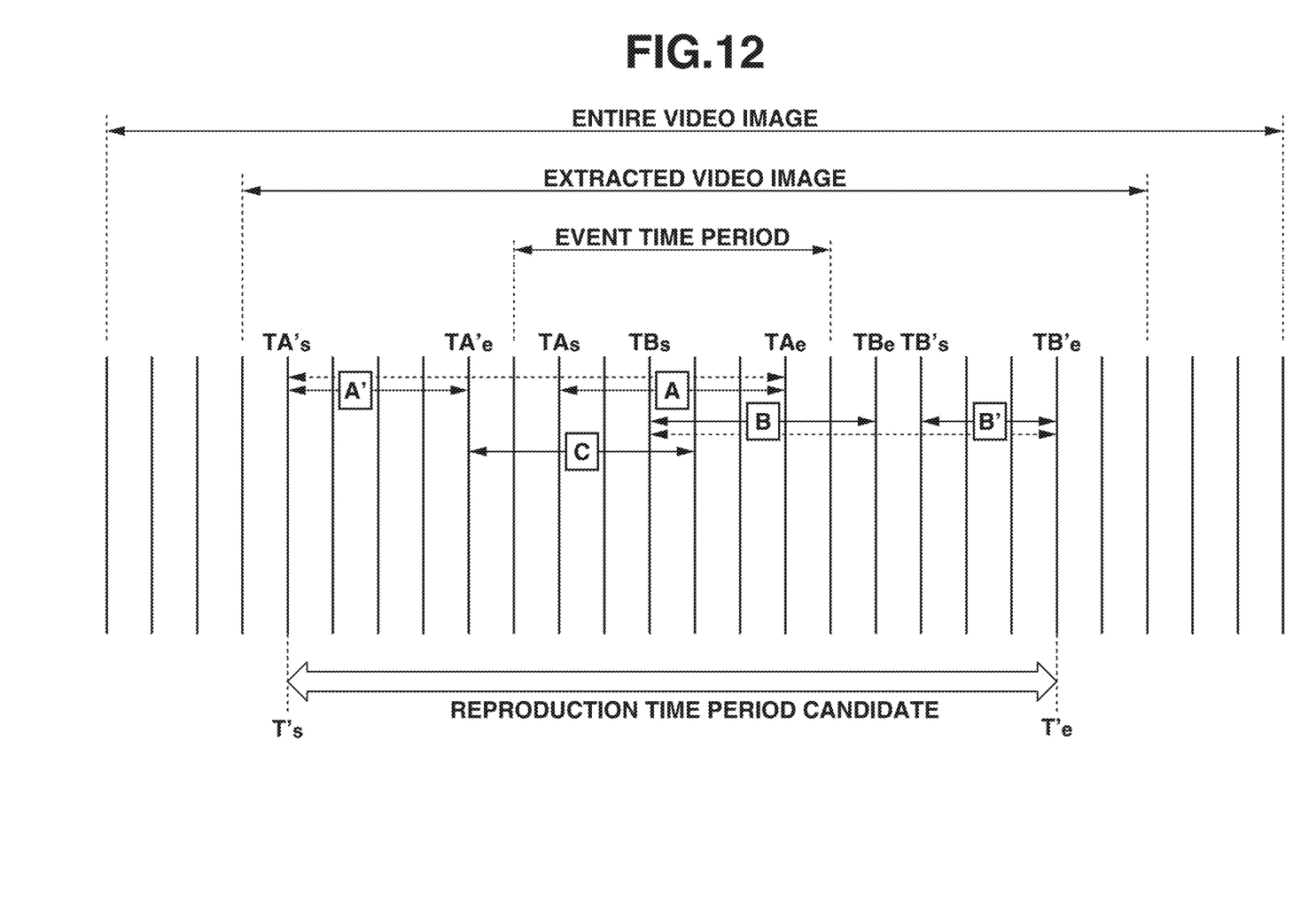
FIG. 12 is a diagram schematically illustrating the object appearance time period.

For example, in the example illustrated in FIG. 12, the object A is detected during a time period from TAs to TAe and also a time period from TA's to TA'e that is before the time period from TAs to TAe and is discontinuous with the time period from TAs to TAe. In this case, the time period from TA's to TAe is the object appearance time period of the object A. That is, in a case where an object is once moved out of a moving image, or disappears and is again moved in to appear in the moving image, the object appearance time periods of this object are considered as a continuous object appearance time period.

Similarly, the object B is detected during a time period from TBs to TBe and also a time period from TB's to TB'e that is after the time period from TBs to TBe and is discontinuous with the time period from TBs to TBe. In this case, the object appearance time period of the object B is from TBs to TB'e. In this case, the time period from TA's to TB'e is determined as the reproduction time period candidate.

Further, the object search range in this case may be different from the event search range. Further, the object search range may be predetermined as a range based on the event time period and can be set or changed in response to a user's operation.

In a third modification, the moving image reproduction apparatus 100 transmits a moving image corresponding to a reproduction time period or an entire moving image, the reproduction time period of which has specified, to an external device.

Further, in a fourth modification, the moving image reproduction apparatus 100 includes an image capturing unit. That is, a digital video camera may have a function of the moving image reproduction apparatus 100. In this case, a moving image to be reproduced is a moving image captured by the image capturing unit.

The exemplary embodiments of the present disclosure have been described in detail above, but the present disclosure is not limited to the specific exemplary embodiments and thus can be variously modified and changed without departing from the spirit of the present disclosure described in claims.

The present disclosure can be achieved by supplying a program for achieving one or more functions in the above-described exemplary embodiments to a system or an apparatus via a network or a storage medium and by one or more processors in a computer of the system or the apparatus reading out and executing the program. Further, the present disclosure can be achieved by a circuit (e.g., application-specific integrated circuit (ASIC)) that achieves one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-021952, filed Feb. 8, 2019, which is hereby incorporated by reference herein in its entirety.

What is claimed is:

1. A moving image reproduction apparatus, comprising:
one or more processors; and
a memory for storing programs to be executed by the one or more processors,
wherein the programs stored in the memory cause, when executed by the one or more processors, the one or more processors to operate to:
detect an event occurring in a moving image, wherein the event is an abnormal state;
detect a plurality of objects during an event time period when the event occurs;
specify, for the detected objects respectively, appearance time periods during which the respective detected objects continuously appears in the moving image, wherein each of the appearance time periods is a time period from a first time point when an object appeared first in the moving image to a second time point when the object disappeared from the moving image;
determine, based on the appearance time periods for the detected objects respectively, a candidate time period which is a period between earliest one of the first time points and latest one of the second time points;
compare the candidate time period with the event time period to determine whether or not the candidate time period is including the event time period; and
perform control to display a moving image of a time period corresponding to the candidate time period, which is replayed in a case that the candidate time period includes the event time period, and a moving image of a time period corresponding to the event time period which is replayed in a case that the candidate time period does not include the event time period.

2. The moving image reproduction apparatus according to claim 1, wherein the reproduction time period does not include an appearance time period of an object which has disappeared before the event time period or an appearance time period of an object which has appeared after the event time period.

3. The moving image reproduction apparatus according to claim 1, wherein a time period from an earliest starting point in starting points in a plurality of discontinuous time periods to a latest point in ending points in the plurality of discontinuous time periods, as the appearance time period in a case where the time period during which the at least one object detected in the moving image recorded during the event time period appears in the moving image includes the plurality of discontinuous time periods is specified.

4. The moving image reproduction apparatus according to claim 1,
wherein the event time period is a part of a search time range which is a longer time period than the event time period, and
the appearance time periods for each object detected during the event time period are searched within the search time range.

5. The moving image reproduction apparatus according to claim 4,
wherein the search time range is set by a user's operation.

6. The moving image reproduction apparatus according to claim 1, wherein the event time period as the reproduction time period is displayed in a case where the candidate time period is shorter than the event time period.

7. The moving image reproduction apparatus according to claim 1, wherein the event is detected based on a predetermined sound feature.

8. The moving image reproduction apparatus according to claim 1, wherein the event includes an event that someone or something is left behind and something is carried away, and an event that not less than a predetermined number of human figures are present.

9. The moving image reproduction apparatus according to claim 1, wherein the appearance time period for each of the detected objects overlaps with the event time period.

10. The moving image reproduction apparatus according to claim 1, wherein the moving image of the time period corresponding to the candidate time period is replayed in a case that the candidate time period includes the event time period, and a moving image of a time period corresponding to the event time period is replayed in a case that the candidate time period does not include the event time period.

11. The moving image reproduction apparatus according to claim 1, wherein the event is an abnormal state detected based on an image feature or an abnormal sound.

12. A moving image reproduction system, comprising:
the moving image reproduction apparatus according to claim 1; and
a monitoring camera.

13. A moving image reproduction method to be performed by a moving image reproduction apparatus, the method comprising:
detecting an event occurring in a moving image, wherein the event is an abnormal state;
detecting a plurality of objects during an event time period when the event occurs;
specifying, for the detected objects respectively, appearance time periods during which the respective detected objects continuously appears in the moving image, wherein each of the appearance time periods is a time period from a first time point when an object appeared first in the moving image to a second time point when the object disappeared from the moving image;
determining, based on the appearance time periods for the detected objects respectively, a candidate time period which is a period between earliest one of the first time points and latest one of the second time points;
comparing the candidate time period with the event time period to determine whether or not the candidate time period is including the event time period; and
performing control, in display control, displaying a moving image of a time period corresponding to the candidate time period, which is replayed in a case that the candidate time period includes the event time period, and a moving image of a time period corresponding to the event time period which is replayed in a case that the candidate time period does not include the event time period.

14. A non-transitory computer readable storage medium storing a program that causes a moving image reproduction apparatus to perform a moving image reproduction method, the method comprising:
detecting an event occurring in a moving image, wherein the event is an abnormal state;
detecting a plurality of objects during an event time period when the event occurs;
specifying, for the detected objects respectively, appearance time periods during which the respective detected objects continuously appears in the moving image, wherein each of the appearance time periods is a time period from a first time point when an object appeared first in the moving image to a second time point when the object disappeared from the moving image;
determining, based on the appearance time periods for the detected objects respectively, a candidate time period which is a period between earliest one of the first time points and latest one of the second time points;
comparing the candidate time period with the event time period to determine whether or not the candidate time period is including the event time period; and
performing control, in display control, displaying a moving image of a time period corresponding to the candidate time period, which is replayed in a case that the candidate time period includes the event time period, and a moving image of a time period corresponding to the event time period which is replayed in a case that the candidate time period does not include the event time period.

* * * * *